(12) United States Patent
Oyama et al.

(10) Patent No.: US 7,755,993 B2
(45) Date of Patent: Jul. 13, 2010

(54) OPTICAL INFORMATION RECORDING REPRODUCTION DEVICE

(75) Inventors: Katsuhiro Oyama, Gunma (JP); Mitsuo Sekiguchi, Gunma (JP); Hiroya Kakimoto, Gunma (JP); Fuyuki Miyazawa, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 520 days.

(21) Appl. No.: 11/843,556

(22) Filed: Aug. 22, 2007

(65) Prior Publication Data
US 2008/0062833 A1    Mar. 13, 2008

(30) Foreign Application Priority Data
Aug. 25, 2006   (JP) ............................. 2006-228811

(51) Int. Cl.
*G11B 7/00* (2006.01)
(52) U.S. Cl. ................ 369/53.27; 369/53.26; 369/116; 369/59.11
(58) Field of Classification Search ................ 369/47.5, 369/47.51, 47.53, 53.12, 53.26, 53.27, 59.11, 369/116
See application file for complete search history.

(56) References Cited

U.S. PATENT DOCUMENTS 5,665,957 A * 9/1997 Lee et al. ................ 369/53.23
5,907,530 A * 5/1999 Cho et al. ................ 369/120
2002/0060958 A1 * 5/2002 Ando et al. ............... 369/44.23
2005/0002285 A1 * 1/2005 Ando et al. ............... 369/44.14

FOREIGN PATENT DOCUMENTS

| JP | 9-197264 | 4/1997 |
| JP | 9-251662 | 9/1997 |
| JP | 2004-103093 | 4/2004 |

* cited by examiner

*Primary Examiner*—Wayne R Young
*Assistant Examiner*—Adam R Giesy
(74) *Attorney, Agent, or Firm*—Law Office of Katsuhiro Arai

(57) ABSTRACT

An optical information recording reproduction device is disclosed, in which aberration detection is stably performed, so that an excellent record grade can be achieved. An RF signal is subjected to differential operation along a time axis of the signal, the RF signal being obtained from reflected light including primary light situated in the periphery of a primary dark ring enclosing zero-order light in a central portion of a beam spot formed on a pit; pulse signal waveforms are represented in an absolute value form, the pulse signal waveforms being generated in correspondence with front and rear ends of the beam spot on the time axis; the pulse signal waveforms represented in the absolute value form are stored into a storage medium; the stored, two pulse signal waveforms are combined to generate a beam profile of the beam spot formed on an optical recording medium; and a beam spot diameter, spherical aberration, and coma aberration of a record laser beam are adjusted based on the beam profile.

13 Claims, 7 Drawing Sheets

OPTICAL INFORMATION RECORDING REPRODUCTION DEVICE

BACKGROUND OF THE INVENTION

1. Field of the Invention

The present invention relates to an optical information recording reproduction device that performs record operation of a signal into an optical recording medium using a laser beam, and more specifically relates to an optical information recording reproduction device in which an excellent record grade is achieved by stably performing aberration detection.

2. Description of the Related Technology

Recording information into an optical recording medium such as optical disk is performed in the following way. First, recording data are modulated by the EFM (Eight to Fourteen Modulation) method or the 8-16 Modulation method, and then a record pulse is formed based on the modulated signal. Then, intensity or irradiation timing of a laser beam is controlled based on the record pulse, so that a record pit is formed on the optical recording medium.

In the optical information record, numerical aperture (NA) of an object lens is effectively increased for record reproduction of the optical recording medium having high density and high capacity. For such optical recording with high density and high capacity, an allowable variation range of a beam spot diameter is extremely reduced, in addition, allowable manufacturing errors of the optical recording medium and a pickup device (thickness and warp in a medium, and lens tilt and the like in a pickup) must be extremely reduced.

In a usual optical information recording reproduction device, regarding allowable manufacturing errors of the optical recording medium and pickup device, there is a problem of aberration generation due to the manufacturing errors.

As an example of a method of suppressing the aberration generation, a method is proposed (JP-A-9-197264 "Real Optical System Having Disk Substrate with Variable Thickness": MARK CO., LTD.), in which a first negative lens and a second positive lens are disposed in this order after a collimator lens, and when thickness of a substrate of an optical recording medium is increased, an interval on a light axis between the first negative lens and the second positive lens is decreased, and when thickness of the substrate of the optical recording medium is decreased, the interval on the light axis between the first negative lens and the second positive lens is increased, thereby aberration generation is suppressed. Moreover, a method is proposed (JP-A-2004-103093 "Optical Pickup and Optical Information Processor Using the Same: Ricoh Company, Ltd.), in which a distance between an object lens and an attachment lens is optionally changed in correspondence with thickness of a substrate of an optical recording medium using a pickup having a mechanism for detecting a wave front configuration, thereby aberration is suppressed.

Furthermore, a recording medium recording reproduction device and a recording medium record reproduction method disclosed in JP-A-09-251662 disclose a player and a method in which a spherical aberration due to an error of thickness of a substrate of an optical recording medium is reduced in a pickup having a second group lens, so that an excellent reproduction signal is obtained.

To achieve an excellent record grade in the optical information recording reproduction device, optimization of a diameter of laser beam spot irradiated onto an optical recording medium, selection of strategy optimized for a laser spot and an optical recording medium, and suppression of aberration generated due to a manufacturing error are important items.

While the JP-A-9-197264 "Real Optical System Having Disk Substrate with Variable Thickness: MARK CO., LTD." shows a unit of correcting aberration, it does not refer to a method of detecting the aberration.

The JP-A-09-251662 entitled "Recording Medium Recording reproduction device and Recording Medium Record Reproduction Method: Sony Corporation" shows a method of detecting thickness of a substrate of an optical recording medium in detection of a focus error (FE) signal. However, separation detection of spherical and coma aberrations is expected to be difficult in the focus error signal.

SUMMARY OF CERTAIN INVENTIVE ASPECTS

One inventive aspect relates to an optical information recording reproduction device in which aberration detection is stably performed, so that an excellent record grade can be achieved. The optical information recording reproduction device irradiates a laser beam from an optical pickup to an optical recording medium to form a pit corresponding to information for record on the optical recording medium so as to record information, including a unit that reproduces an RF signal from a pit recorded on the optical recording medium, the RF signal being obtained from a pit having a length equal to or longer than a diameter of primary light situated in the periphery of a primary dark ring enclosing zero-order light in a central portion of a beam spot formed on the optical recording medium; a unit that is inputted with the reproduced RF signal, and performs differential operation of the RF signal along a time axis of the RF signal so as to obtain pulse signal waveforms generated in correspondence with a front end and a rear end of the beam spot formed on the optical recording medium on the time axis; a unit that represents the pulse signal waveforms generated in correspondence with the front and rear ends in an absolute value form, and stores the pulse signal waveforms represented in the absolute value form into a storage medium; a beam profile generation unit that combines the two pulse signal waveforms stored in the storage medium to generate a beam profile of the beam spot formed on the optical recording medium; and an adjustment unit that adjusts a record laser beam based on the beam profile.

According to the first technical approach, the RF signal obtained from the pit having the length equal to or longer than the diameter of the primary light is reproduced, and the RF signal is subjected to differential operation along the time axis of the RF signal so as to obtain the pulse signal waveforms generated in correspondence with the front and rear ends of the beam spot formed on the optical recording medium on the time axis. Furthermore, the pulse signal waveforms generated in correspondence with the front and rear ends are represented in the absolute value form, and the pulse signal waveforms represented in the absolute value form are stored into the storage medium. The two pulse signal waveforms stored in the storage medium are combined to generate the beam profile of the beam spot formed on the optical recording medium, and a record laser beam is adjusted based on the beam profile. By the beam profile, the beam spot diameter can be detected, and the coma aberration and the spherical aberration can be detected based on intensity of primary dark rings and intensity of primary light at the front and rear ends. Thus, the beam spot diameter, coma aberration, and spherical aberration of the record laser beam can be corrected.

Thus, since pits (marks) and spaces can be accurately formed by stable beam spot management and aberration management, beam spot diameter detection and aberration detection can be stably performed, and consequently an excellent record grade, that is, a high record grade such as low error rate and wide margin can be achieved in information record into an optical recording medium with high density and high capacity.

DETAILED DESCRIPTION OF CERTAIN EMBODIMENTS

Hereinafter, an embodiment of the invention will be described with reference to drawings.

Figure 1:
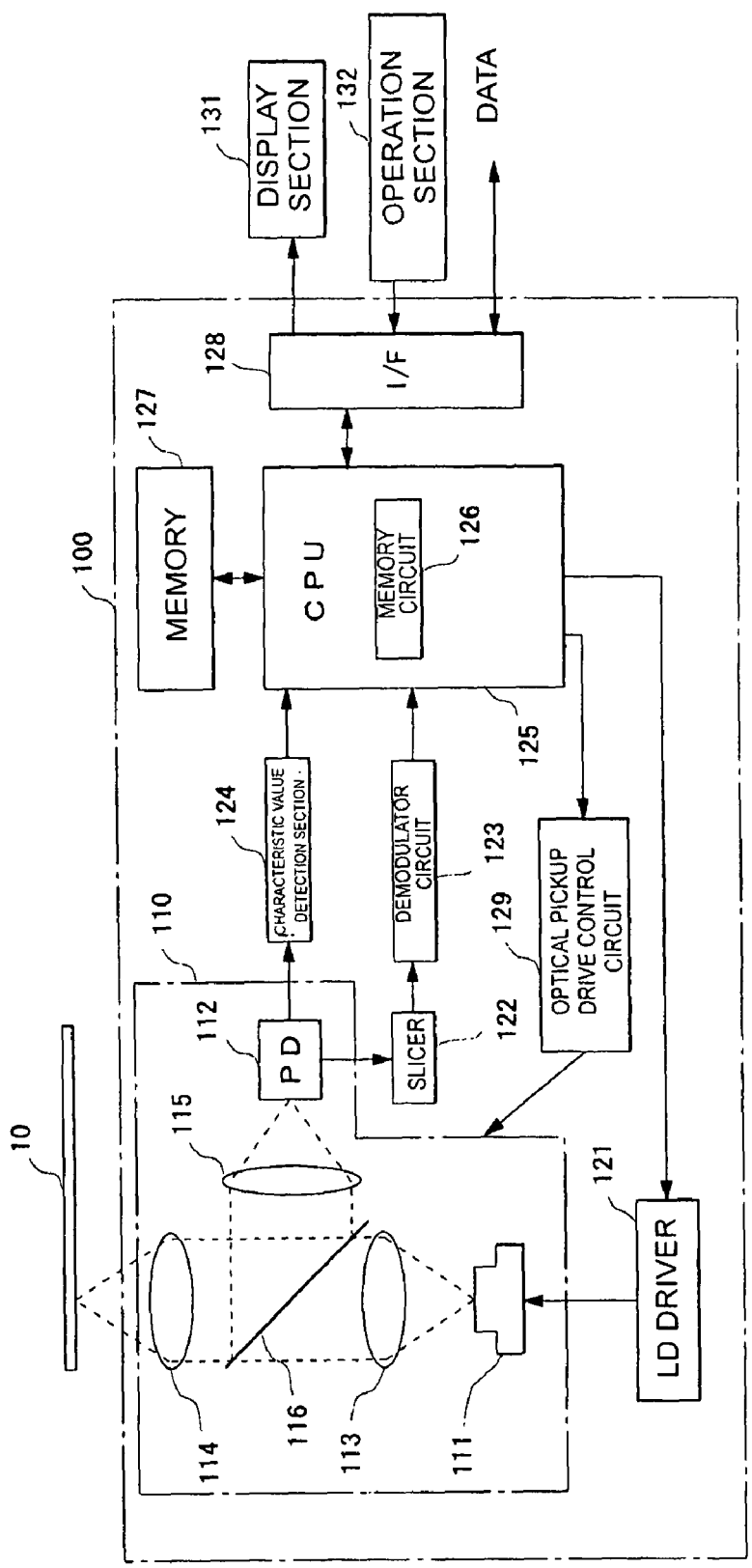
FIG. 1 is a block diagram showing an optical information recording reproduction device of an embodiment of the invention.

FIG. 1 is a diagram showing a configuration of an optical information recording reproduction device according to an embodiment of the invention and an optical disk (optical recording medium). In the figure, 10 shows an optical disk, which is an optical recording medium such as known DVD, HD-DVD, and a Blue-ray disk.

An optical information recording reproduction device 100 of the embodiment includes an optical pickup 110, a laser diode (hereinafter, called LD) driver 121, a slicer 122, a demodulator circuit 123, a characteristic value detection part 124, a one-chip CPU element (hereinafter, called CPU) 125, a memory 127, an interface (hereinafter, called I/F) 128, and an optical pickup drive control circuit 129. Here, only components particularly relating to the embodiment are described and explained.

The optical information recording reproduction device 100 of the embodiment is connected with a display part 131 including a personal computer or a display, and an operation part 132 including a keyboard.

The optical pickup 110 has a laser diode (hereinafter, called LD) 111, a photodetector (hereinafter, called PD) 112, a collimator lens 113, an object lens 114, a detection lens 115, and a beam splitter 116. A laser beam ejected from the LD 111 is irradiated to the optical disk 10 through the collimator lens 113, beam splitter 116, and object lens 114. The laser beam reflected by the optical disk 10 is transmitted through the object lens 114 and then reflected by the beam splitter 116, and then injected into the PD 112 via the detection lens 115. The PD 112 outputs a current having a value corresponding to light quantity of the injected beam.

The LD driver 121 supplies a driving current to the LD 111 according to a record signal inputted from the CPU element 125 to cause the LD 111 to emit light.

The slicer 122 slices an output current from the PD 112 with a predetermined threshold value to convert the current into a binarized voltage signal, and outputs the signal.

The demodulator circuit 123 is a circuit that demodulates an encoded, binarized signal outputted from the slicer 122 and outputs the modulated signal to the CPU 125. For example, the circuit 123 demodulates a signal, which was subjected to EFM modulation with pulse width of 3 T to 11 T and thus encoded, as a binarized voltage signal outputted from the slicer 122, and outputs the demodulated digital signal to the CPU 125.

The characteristic value detection part 124 inputs a current signal outputted from the PD 112, then the part reproduces an RF signal from reflected light from the optical disk 10 based on a value of the current, and then detects a characteristic value from the RF signal and outputs the value to the CPU 125 as digital information. A characteristic value detected from the reflected light includes a voltage value of the RF signal. As the other characteristic values, for example, $\beta$, asymmetry, a phase, amplitude and the like are detected, which depend on record laser beam power or a record pulse condition, and are suitable for optimizing the record pulse condition.

The CPU 125 is a known one-chip CPU element, and has a memory circuit 126 in which a computer program for operating the CPU is stored. The CPU 125 controls a driving mechanism part (not shown) to perform adjustment of a position of the optical pickup 110, tracking, and focus, and rotation drive control of the optical disk 10, in addition, records (writes) externally inputted information on the optical disk 10 based on a data table stored in the memory 127, or reads information recorded in the optical disk 10 and outputs the information to an external device. Moreover, the CPU performs a test for information record into the optical disk 10 to obtain an optimum laser beam condition, so that information record can be performed. When a record laser beam including a beam spot diameter, spherical aberration, and coma aberration is adjusted, a beam profile is obtained from an RF signal as described later, and correction processing is performed based on the beam profile so as to adjust the record laser beam.

The memory 127 is connected to the CPU 125, in which data corresponding to many kinds of optical disks are recorded in a data table as a strategy table, and information of a permissible range of a beam spot diameter detected from a beam profile described later and waveform data of a beam profile with no aberration are stored. The information and data are previously obtained by an experiment or the like and stored in the memory 127.

The I/F 128 is an interface for connecting the CPU to the external display part 131 and operation part 132, and serves to transfer record reproduction information between an external device and the CPU 125.

The optical pickup drive control circuit 129 controls drive of the optical pickup 110 upon receiving a control instruction from the CPU 125. The drive control includes tracking control, focus control and the like.

In the configuration, record reproduction of information into/from the optical disk 10 is performed using the laser beam outputted from the LD 111 for sending and receiving of information with respect to an external device such as a personal computer (PC).

When information is recorded into the optical disk 10, record information is encoded, and the encoded record information is processed in the CPU 125, thereby strategy as a record condition into the optical disk 10 is determined, then the strategy is converted into a record pulse by the LD driver 121, and then a laser beam pulsed based on the record pulse is outputted from the LD 111.

The LD driver 121 drives the LD 111 according to the inputted record pulse. The LD 111 controls an output laser beam in correspondence with the record pulse, and irradiates the controlled laser beam to the optical disk 10 rotating at a constant line speed or a constant rotation speed via the collimator lens 113, beam splitter 116, and object lens 114, so that a record pattern including arrays of pits and spaces corresponding to desired recorded information is recorded on the optical disk 10.

When information is recorded into the optical disk 10, test information is recorded and reproduced into/from a test area (test writing area) of the optical disk 10 in order to determine an optimum irradiation condition of a laser beam as well known. At that time, adjustment of a beam spot diameter, spherical aberration correction, and coma aberration correction of a recorded laser beam are also performed in the embodiment.

Hereinafter, the adjustment of the beam spot diameter, spherical aberration correction, and coma aberration correction of the recorded laser beam in the embodiment are described with reference to FIGS. 2 to 11. Here, adjustment of the recorded laser beam before recording information into the optical disk 10 is described.

In the embodiment, the beam spot diameter, a condition of the spherical aberration correction, and a condition of the coma aberration correction of the recorded laser beam are detected from a beam profile. The beam profile is generated in the following way from reflected light from a pit formed on the optical disk 10.

Figure 2:
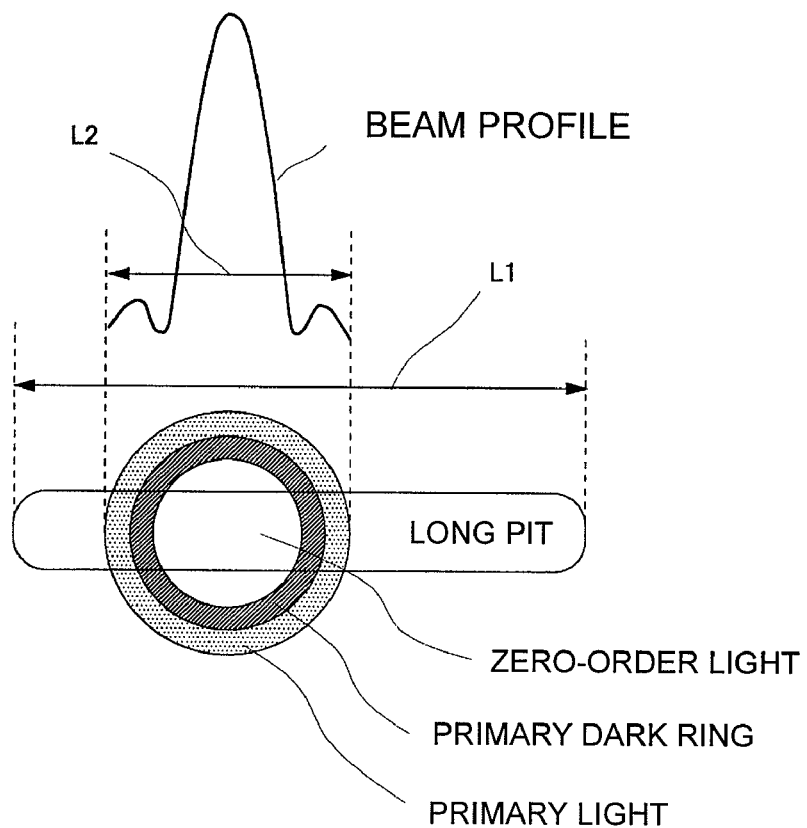
FIG. 2 is a diagram for explaining a beam spot formed on a pit in the embodiment of the invention.
Figure 3:
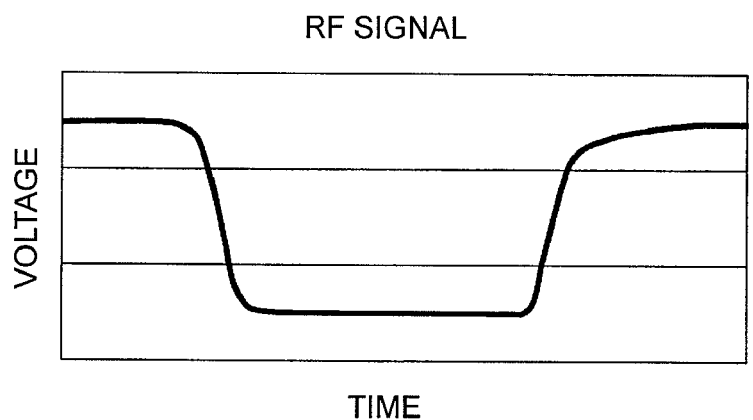
FIG. 3 is a diagram showing a waveform of an RF signal in the embodiment of the invention.

That is, first, an RF signal from reflected light from a long pit is reproduced, the long pit being formed on the optical disk 10. The long pit described herein refers to a pit that provides reflected light in which a primary dark ring exists, which encloses zero-order light in a central portion of a beam spot formed on the pit, and primary light exists in the periphery of the primary dark ring, as shown in FIG. 2. That is, a length L1 of the pit is longer than a diameter L2 of the beam spot including the primary light. FIG. 2 shows a beam spot of irradiated light on the long pit formed on the optical disk 10 and an intensity distribution (beam profile).

Figure 4:
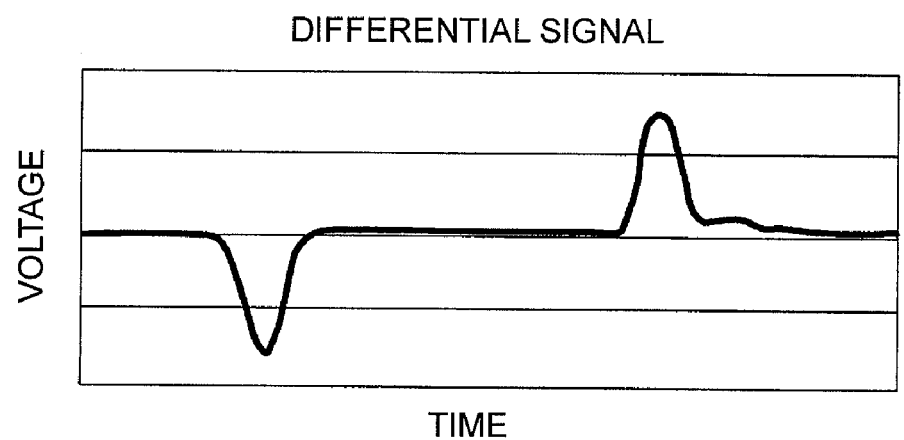
FIG. 4 is a diagram showing a waveform of a signal obtained by performing differential operation of the RF signal in the embodiment of the invention.

Next, the RF signal (see FIG. 3) obtained from the reflected light from the pit is subjected to differential operation along a time axis of the signal, so that pulse signals generated in correspondence with front and rear ends of the beam spot on the time axis can be obtained as shown in FIG. 4.

Figure 5:
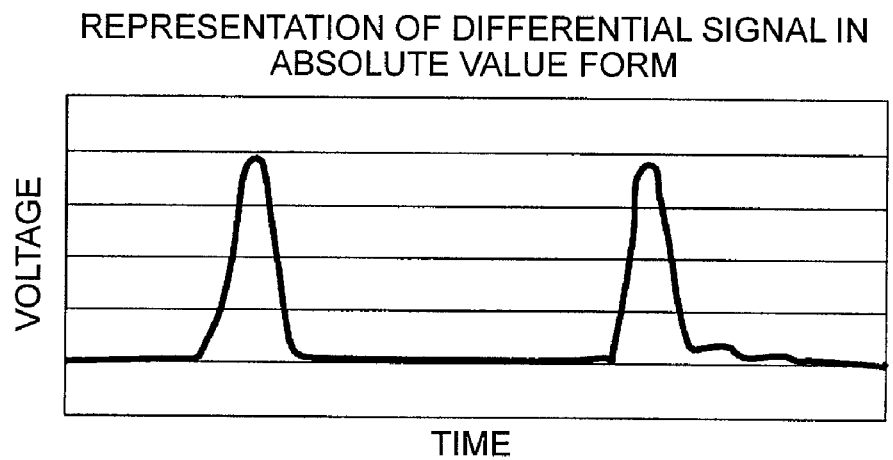
FIG. 5 is a diagram showing a waveform of a signal that is obtained by performing differential operation of the RF signal and represented in an absolute value form in the embodiment of the invention.

Then, the obtained pulse signals are represented in an absolute value form as shown in FIG. 5, and waveforms of the pulse signals represented in the absolute value form are stored into the memory (storage medium) 127.

Figure 6:
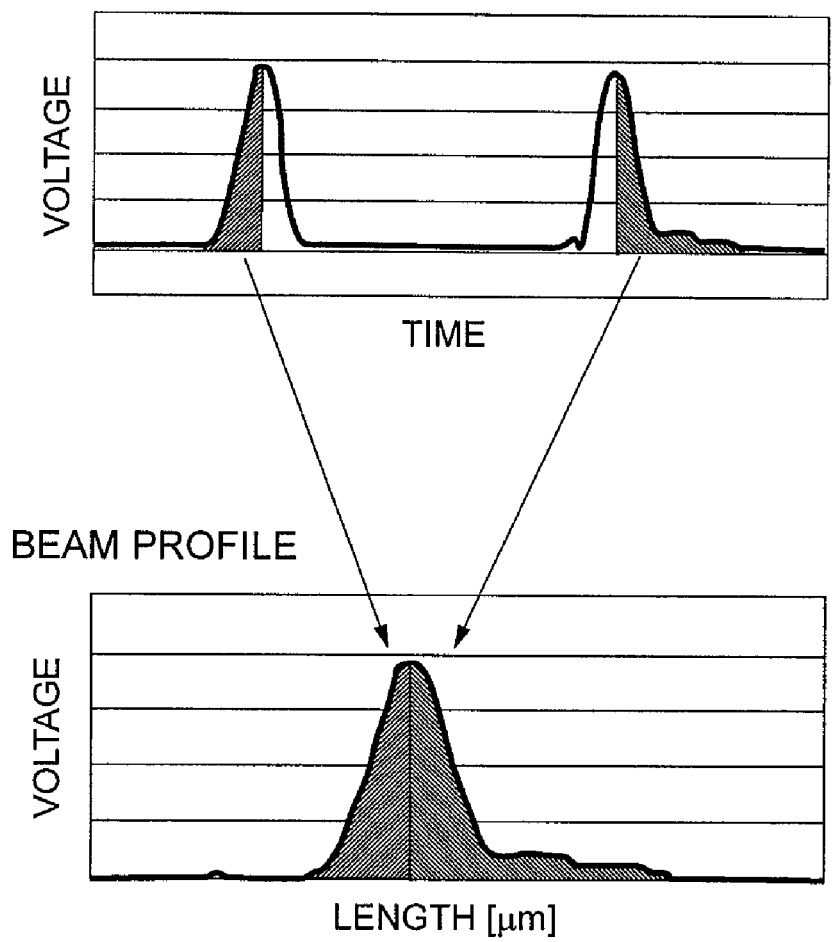
FIG. 6 is a diagram for explaining a method of generating a beam profile in the embodiment of the invention.
Figure 7:
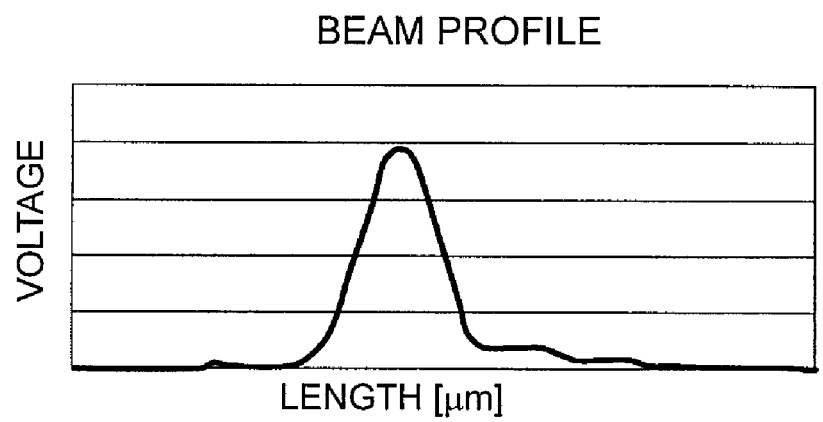
FIG. 7 is a diagram showing a waveform of the beam profile in the embodiment of the invention.

Next, the waveforms of the two pulse signals stored in the memory 127 are combined to generate a beam profile of the beam spot formed on the optical recording medium. In the embodiment, as shown in FIG. 6, a first half portion of a pulse signal represented in the absolute value form at a front end side of the beam spot, and a second half portion of a pulse signal represented in the absolute value form at a rear end side of the beam spot are combined such that peak positions of them correspond to each other, so that the beam profile is generated. Thus, a beam profile having a waveform as shown in FIG. 7 is obtained.

The condition of the spherical aberration correction, the condition of the coma aberration correction, and the beam spot diameter can be detected from the beam profile obtained in this way.

Figure 8:
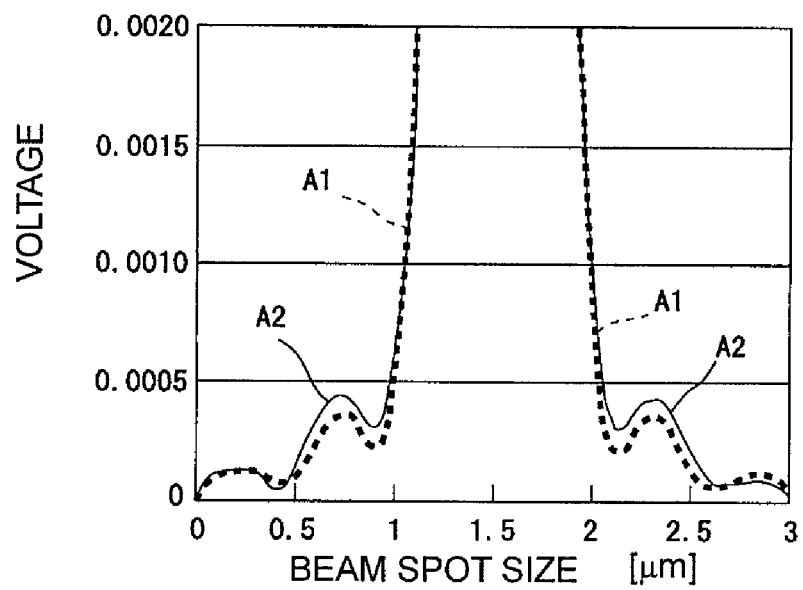
FIG. 8 is a diagram for explaining a relationship between a waveform of the beam profile and a spherical aberration in the embodiment of the invention.

FIG. 8 shows beam profiles being different from each other due to difference in spherical aberration condition. In FIG. 8, a beam profile A1 shown by a broken line is a profile in the case of a small spherical aberration, and a beam profile A2 shown by a solid line is a profile in the case of a large spherical aberration. In this way, when spherical aberration is large, intensity of the primary dark ring is increased. Therefore, intensity of a primary dark ring of a beam profile in a condition of no aberration is previously stored in the memory 127, and an actual detection value is compared to a value of such stored intensity, so that spherical aberration correction processing can be performed. Moreover, it is acceptable that intensity of a primary dark ring of a beam profile of a pit recorded in the test area of the optical disk 10 is used as a reference value, and intensity of a primary dark ring, which is obtained during recording information into a data recording area, is compared to the reference value, thereby spherical aberration correction is performed.

Figure 9:
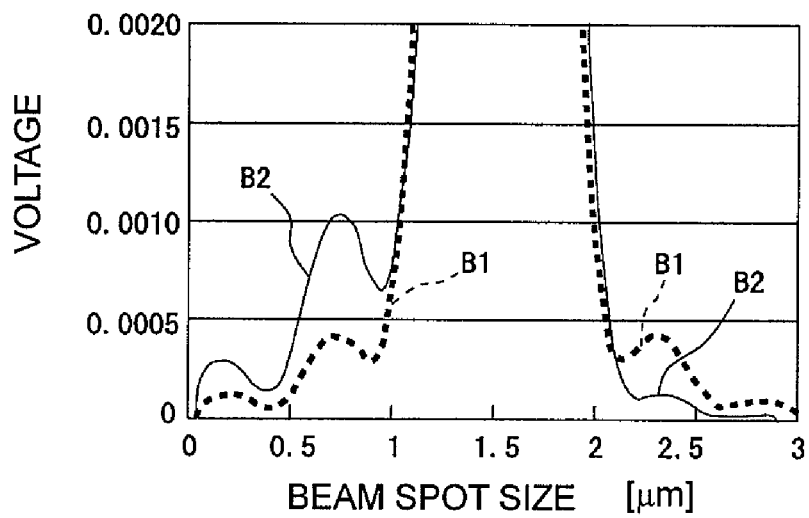
FIG. 9 is a diagram for explaining a relationship between a waveform of the beam profile and a coma aberration in the embodiment of the invention.

FIG. 9 shows beam profiles being different from each other due to difference in coma aberration condition. In FIG. 9, a beam profile B1 shown by a broken line is a profile in the case of a small coma aberration, and a beam profile B2 shown by a solid line is a profile in the case of a large coma aberration. In this way, when coma aberration is large, intensity of the primary light in the front end is significantly different from that in the rear end, and intensity of the primary light in one of the front and rear ends is significantly increased compared with intensity in the case of a small coma aberration. Therefore, intensity of primary light of a beam profile in a condition of no aberration is previously stored in the memory 127, and an actual detection value is compared to a value of such stored intensity, so that coma aberration correction processing can be performed. Moreover, it is acceptable that intensity of primary light of a beam profile of a pit recorded in the test area of the optical disk 10 is used as a reference value, and intensity of primary light, which is obtained during recording information into a data recording area, is compared to the reference value, thereby coma aberration correction is performed. While the front end of the beam profile is approximately symmetric with the rear end thereof in the case of a small coma aberration, the front end of the beam profile is asymmetric with the rear end thereof in the case of a large coma aberration.

Figure 10:
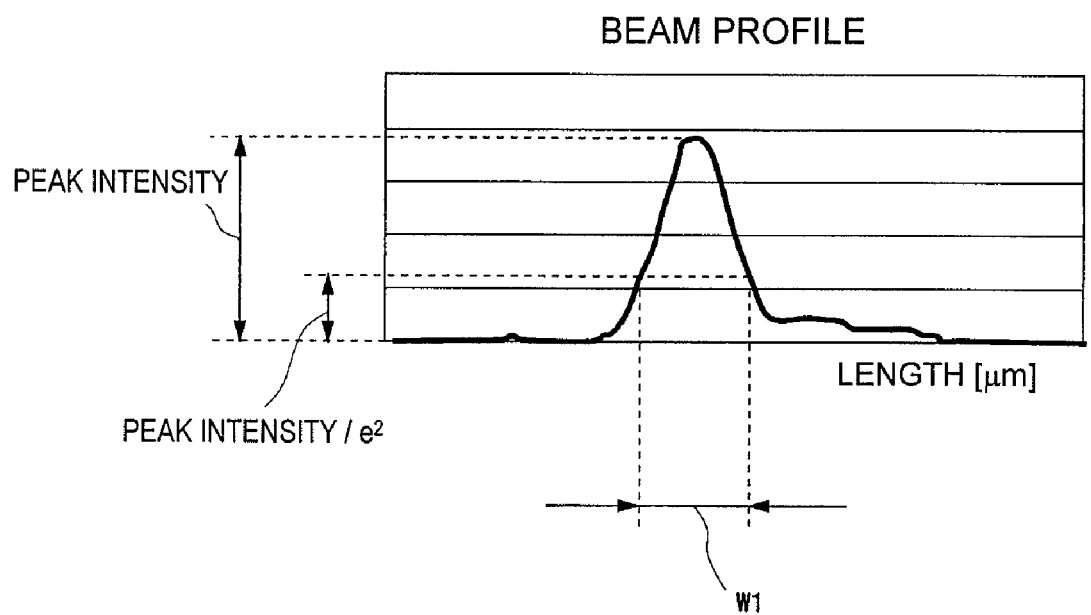
FIG. 10 is a diagram for explaining a relationship between a waveform of the beam profile and a beam spot diameter in the embodiment of the invention.

FIG. 10 shows an example of obtaining the beam spot diameter from the beam profile. In the embodiment, length between front and rear ends at a position of intensity is detected as a beam spot diameter W1, the intensity having a value obtained by dividing peak intensity of the beam profile by $e^2$ (e is the base of the natural logarithm). Depending on difference in configuration of equipment or detection condition, length between the front and rear ends at a position of intensity having a value obtained by dividing the peak intensity by e, or a position of intensity having a value obtained by dividing the peak intensity by 2 may be detected as the beam spot diameter W1.

As described before, an experiment is previously conducted, so that the beam profile is obtained from a beam spot having an optimum beam spot diameter, no spherical aberration, and no coma aberration, and based on this, information of a permissible range of the beam spot diameter and waveform data of the beam profile are previously stored in the memory 127.

Figure 11:
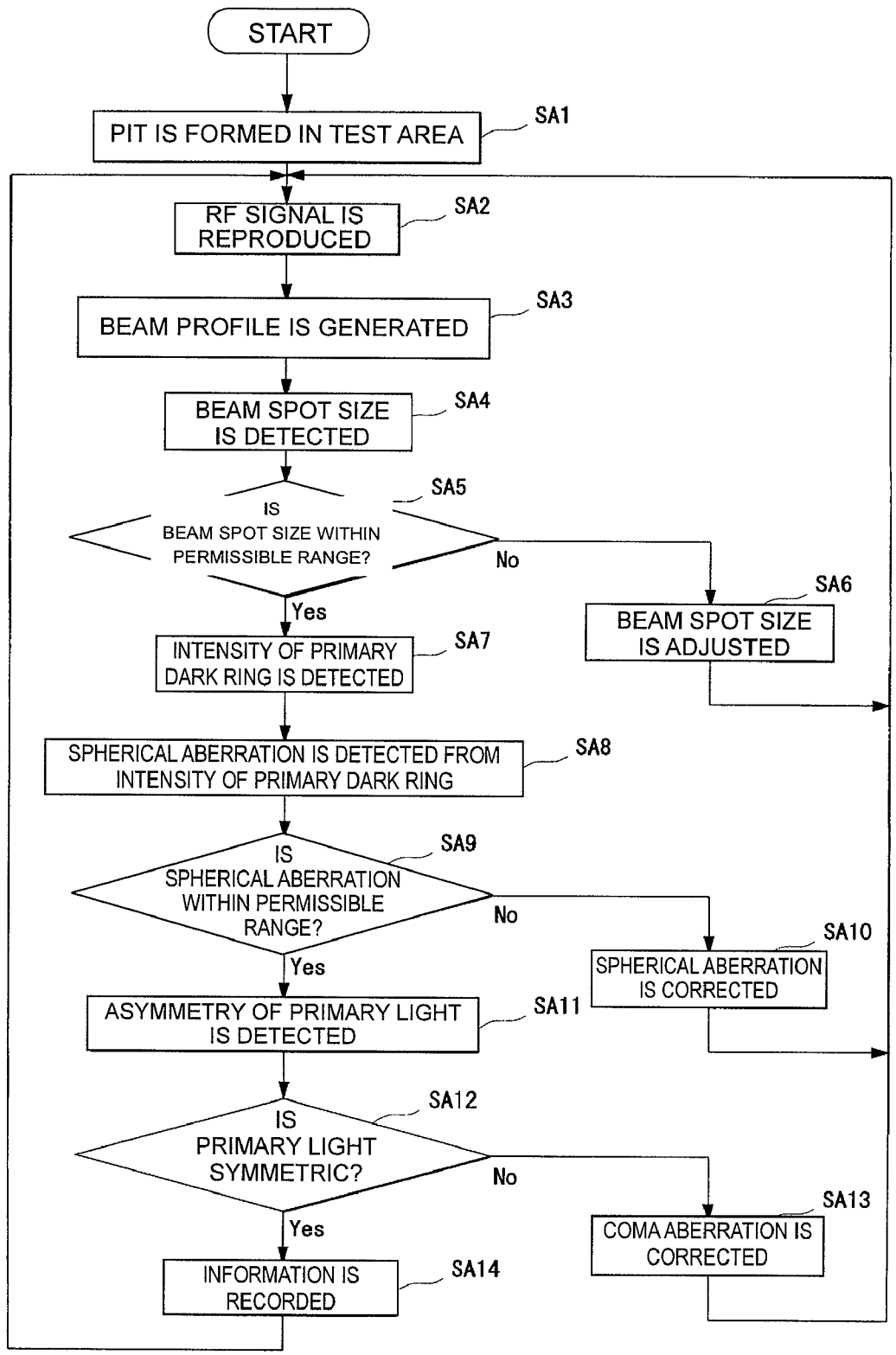
FIG. 11 is a flowchart for explaining a relevant part of correction processing in the embodiment of the invention.

Next, the adjustment of the beam spot diameter, spherical aberration correction, and coma aberration correction are described, which are performed at start of information record into the optical disk 10, and during the information record, with reference to a flowchart of FIG. 11.

When information record is started into the optical disk 10, before starting record of information for record into the information record area, pits are formed in the test area (test writing area) of the optical disk 10 (SA1), and the pits are reproduced to adjust a record laser beam. At that time, the pits described above are formed such that the beam profile can be generated.

Next, an RF signal is reproduced from reflected light from the pit formed on the optical disk 10 (SA2), and a beam profile is generated from the RF signal (SA3). Furthermore, the beam spot diameter W1 is detected from the beam profile (SA4), then the detected beam spot diameter is compared to a beam spot diameter as a reference stored in the memory 127, and whether difference between the beam spot diameters has a value within a permissible range or not is determined (SA5). When a value of difference between the beam spot diameters is not within the permissible range, the optical pickup 110 is controlled via the optical pickup drive control circuit 129 so as to adjust the beam spot diameters (SA6), then a step is shifted to processing of the SA2 to repeat the same processing as above so that the beam spot diameter of the beam profile generated from the RF signal is close to the beam spot diameter as the reference.

As a result of determination of the SA5, when a beam spot diameter is within the permissible range, that is, the beam spot diameter is equivalent or close to the beam spot diameter as the reference, intensity of the primary dark ring of the beam profile is detected (SA7), and the detected intensity of the primary dark ring is compared to intensity of a primary dark ring in the waveform data of the beam profile stored in the memory 127, so that a condition of spherical aberration is detected by a value of difference in intensity between the primary dark rings (SA8).

Furthermore, whether a condition of the detected spherical aberration is within a permissible range or not, that is, whether the value of difference in intensity between the primary dark rings is within a permissible range or not is determined (SA9), and when it is not within the permissible range, the optical pickup 110 is controlled via the optical pickup drive control circuit 129 so as to adjust the spherical aberration (SA10), then a step is shifted to the processing of the SA2 to repeat the same processing as above so that the spherical aberration is within the permissible range.

As a result of determination of the SA9, when the condition of the spherical aberration is within the permissible range, asymmetry of the primary light of the beam profile is detected (SA11), and a condition of the coma aberration is detected by difference between intensity of the detected primary light at the front end side and intensity of the detected primary light at the rear end side (SA12).

Furthermore, whether a condition of the detected coma aberration is within a permissible range or not, that is, whether a value of difference between intensity of the primary light at the front end side and intensity of the primary light at the rear end side is within a permissible range or not is determined (SA13), and when it is not within the permissible range, the optical pickup 110 is controlled via the optical pickup drive control circuit 129 so as to adjust the coma aberration (SA14), then a step is shifted to the processing of the SA2 to repeat the same processing as above so that the coma aberration is within the permissible range.

As a result of determination of the SA 13, when a condition of the detected coma aberration is within the permissible range, the information for record is recorded (SA14).

Then, the processing of the above SA2 to SA13 is repeated even while information is recorded into the record area, thereby an appropriate beam spot diameter can be continuously kept, and the record laser beam can be kept in a condition of small or no spherical and coma aberrations.

As described above, according to the embodiment, the spherical and coma aberrations can be easily detected in a separated manner, so that stable aberration detection can be performed in order to achieve an excellent record grade. Therefore, according to the optical information recording reproduction device, since pits (marks) and spaces can be accurately formed by stable beam spot management and aberration management, beam spot diameter detection and aberration detection can be stably performed, and consequently an excellent record grade, that is, a high record grade including low error rate and wide margin can be achieved in information record into the optical disk 10 with high density and high capacity.

Moreover, to simply determine start of information record, it is acceptable that one of a waveform of an RF signal obtained from reflected light from a pit recorded on the optical disk 10 in an ideal condition, and a waveform of a signal obtained by performing differential operation of the RF signal is previously stored in the memory 127, and a waveform of an RF signal obtained from reflected light from a pit recorded on the optical disk 10 as an information record object, or a waveform of a signal obtained by performing differential operation of the RF signal is obtained, and then the obtained waveform is compared to the waveform stored in the memory 127, and when difference between the waveforms is within a predetermined permissible range, information record is determined to be able to be recorded.

Moreover, it is acceptable that the FE signal is concurrently detected while performing aberration correction as described before, thereby defocusing amount is concurrently detected.

Moreover, to simplify correction of the spherical aberration and the coma aberration, it is acceptable that the record laser beam is adjusted such that a first half portion of a beam profile is symmetric with a second half portion of the beam profile, thereby the spherical aberration and the coma aberration are corrected.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not by itself be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording reproduction device that irradiates a laser beam from an optical pickup to an optical recording medium to form a pit corresponding to information for record on the optical recording medium so as to record information, the device comprising:

a reproduction unit configured to reproduce an RF signal obtained from a pit having a length equal to or longer than a diameter of primary light situated in the periphery of a primary dark ring enclosing zero-order light in a central portion of a beam spot formed on the optical recording medium for the optical information recording reproduction device, a differentiation unit configured to perform differential operation of the reproduced RF signal along a time axis of the RF signal so as to obtain pulse signal waveforms generated in correspondence with a front end and a rear end of the beam spot formed on the optical recording medium on the time axis, a storing unit configured to store the pulse signal waveforms generated in correspondence with the front end and the rear end in an absolute value form into a storage medium, a beam profile generation unit configured to combine two pulse signal waveforms stored in the storage medium to generate a beam profile of the beam spot formed on the optical recording medium, and an adjustment unit configured to adjust an optical system incorporated in the optical pickup, and a record laser beam based on the beam profile.

2. The optical information recording reproduction device according to claim 1:

wherein the beam profile generation unit comprises a unit configured to combine peak positions of the two pulse signal waveforms recorded in the optical recording medium to generate a beam profile of the beam spot formed on the optical recording medium.

3. The optical information recording reproduction device according to claim 2:

wherein the beam profile generation unit comprises a unit configured to combine a first part of the pulse signal waveform represented in the absolute value form at a front end side of the beam spot formed on the optical recording medium, with a second part of the pulse signal waveform represented in the absolute value form at a rear end side of the beam spot formed on the optical recording medium, so that the beam profile is generated.

4. The optical information recording reproduction device according to claim 1, further comprising:

a unit configured to adjust the optical system incorporated in the optical pickup and the record laser beam such that a first half portion and a second half portion of the beam profile are substantially symmetric with each other.

5. The optical information recording reproduction device according to claim 1, further comprising:

a storage unit in which either a waveform of an RF signal previously obtained from an ideal beam profile, or a waveform of a signal obtained by performing differential operation of the RF signal is stored, and a unit that obtains either a waveform of an RF signal obtained from reflected light from a pit recorded on an optical recording medium as an information record object, or a waveform of a signal obtained by performing differential operation of the RF signal, compares the obtained waveform to the waveform stored in the storage unit, and determines that information record may be started when difference between the waveforms is within a predetermined permissible range.

6. The optical information recording reproduction device according to claim 1, further comprising:

a storage medium configured to store a value of a beam spot diameter of a beam profile generated from a waveform obtained by representing a pulse signal in an absolute value form, the pulse signal being obtained by performing differential operation of an RF signal obtained from reflected light from a pit being previously recorded on an optical recording medium in an ideal condition, a beam spot diameter detection unit configured to detect a range in which a ratio of the beam profile to a peak value is at least one of ½, 1/e, and $1/e^2$, and to detect a beam spot diameter of a laser beam on the optical recording medium based on a result of the detection, and a unit configured to adjust the optical system incorporated in the optical pickup and the record laser beam such that difference between the beam spot diameter detected by the beam spot diameter detection unit and the beam spot diameter stored in the storage unit has a value within a predetermined range.

7. The optical information recording reproduction device according to claim 1, further comprising:

a unit configured to detect intensity of a primary dark ring at a front end of the beam profile and intensity of a primary dark ring at a rear end thereof, and a unit configured to correct spherical aberration such that the detected intensity of each of the two primary dark rings is substantially close to zero.

8. The optical information recording reproduction device according to claim 1, further comprising:

a unit configured to detect intensity of primary light at a front end of the beam profile and intensity of primary light at a rear end thereof, and a unit configured to correct coma aberration such that the detected intensity is even between the two kinds of primary light.

9. A method of recording information on an optical recording medium using an optical information recording reproduction device, the optical device irradiating a laser beam from an optical pickup to the optical recording medium to form a pit corresponding to information for record on the optical recording medium so as to record information, the method comprising:

recording information in a test area of the optical recording medium using an optical device;

reproducing an RF signal obtained from a pit having a length equal to or longer than a diameter of primary light situated in the periphery of a primary dark ring enclosing zero-order light in a central portion of a beam spot formed in the test area, differentiating the RF signal along a time axis of the RF signal so as to obtain pulse signal waveforms generated in correspondence with a front end and a rear end of the beam spot, combining two pulse signal waveforms to generate a beam profile of the beam spot, and adjusting the optical device and a record laser beam based on the beam profile.

10. The method of claim 9, wherein the adjusting further comprises:

detecting the beam spot diameter from the beam profile; and adjusting the optical device such that the difference between the beam spot diameter detected and a reference value is within a predetermined range.

11. The method of claim 9, wherein the adjusting further comprises:
    detecting the spherical aberration based at least in part on the beam profile; and
    adjusting the optical device such that the spherical aberration is within a predetermined range.

12. The method of claim 9, wherein the adjusting further comprises:
    detecting the coma aberration based at least in part on the beam profile; and
    adjusting the optical device such that the coma aberration is within a predetermined range.

13. An optical information recording reproduction device that irradiates a laser beam from an optical pickup to an optical recording medium to form a pit corresponding to information for record on the optical recording medium so as to record information, the device comprising:
    means for recording information in a test area of the optical recording medium using an optical device;
    means for reproducing an RF signal obtained from a pit having a length equal to or longer than a diameter of primary light situated in the periphery of a primary dark ring enclosing zero-order light in a central portion of a beam spot formed in the test area,
    means for differentiating the RF signal along a time axis of the RF signal so as to obtain pulse signal waveforms generated in correspondence with a front end and a rear end of the beam spot,
    means for combining two pulse signal waveforms to generate a beam profile of the beam spot, and
    means for adjusting the optical device and a record laser beam based on the beam profile.

* * * * *